United States Patent
Byeon

(10) Patent No.: US 10,688,425 B2
(45) Date of Patent: Jun. 23, 2020

(54) MULTIFUNCTIONAL FILTER MEDIUM, AND METHOD AND APPARATUS FOR MANUFACTURING SAME

(71) Applicant: Research Cooperation Foundation of Yeungnam University, Gyeongsangbuk-do (KR)

(72) Inventor: Jeong Hoon Byeon, Daegu (KR)

(73) Assignee: Research Cooperation Foundation of Yeungnam University, Gyeongsangbuk-do (KR)

( * ) Notice: Subject to any disclaimer, the term of this patent is extended or adjusted under 35 U.S.C. 154(b) by 0 days.

(21) Appl. No.: 16/066,825

(22) PCT Filed: Dec. 28, 2016

(86) PCT No.: PCT/KR2016/015403
§ 371 (c)(1),
(2) Date: Jun. 28, 2018

(87) PCT Pub. No.: WO2017/116140
PCT Pub. Date: Jul. 6, 2017

(65) Prior Publication Data
US 2019/0009202 A1    Jan. 10, 2019

(30) Foreign Application Priority Data
Dec. 28, 2015  (KR) .................. 10-2015-0187353

(51) Int. Cl.
*B01D 39/20*      (2006.01)
*D01F 9/12*       (2006.01)
(Continued)

(52) U.S. Cl.
CPC ....... *B01D 39/2065* (2013.01); *B01D 53/007* (2013.01); *B01D 53/885* (2013.01);
(Continued)

(58) Field of Classification Search
None
See application file for complete search history.

(56) References Cited

U.S. PATENT DOCUMENTS 7,776,777 B2 *   8/2010   Kim ................. B01J 21/185
                                              427/249.3

FOREIGN PATENT DOCUMENTS

JP    2000-042320 A    2/2000
JP    2001-355119 A    12/2001
(Continued)

OTHER PUBLICATIONS

Safari et al. Carbon Nanotubes Supported by Titanium Dioxide Nanoparticles as Recyclable and Green Catalyst for Mild Synthesis and Dihydropyrimidinones/Thines; Journal of Molecular Structure; 1065-1066, 241-247; 2014.*

*Primary Examiner* — Guinever S Gregorio
(74) *Attorney, Agent, or Firm* — Hammer & Associates, P.C.

(57) ABSTRACT

The present application relates to a multifunctional filter medium and a method of manufacturing the same. The multifunctional filter medium of the present application is capable of significantly reducing fine dust, harmful microorganisms, and toxic gases and reducing a pressure decrease during filtration due to exclusion of high-density nanofiber, thereby minimizing energy required for filtration and exhibiting sufficient filtration performance as a single filter medium.

10 Claims, 3 Drawing Sheets

(51) Int. Cl.

| | | |
|---|---|---|
| *D06M 23/08* | (2006.01) | |
| *B01J 35/00* | (2006.01) | |
| *B01D 53/00* | (2006.01) | |
| *B01D 53/88* | (2006.01) | |
| *B01J 21/18* | (2006.01) | |
| *B01J 35/06* | (2006.01) | |
| *B01J 37/34* | (2006.01) | |
| *D06M 11/44* | (2006.01) | |
| *D06M 11/74* | (2006.01) | |
| *B01D 53/86* | (2006.01) | |
| *B01J 23/06* | (2006.01) | |
| *B01J 35/10* | (2006.01) | |
| *D06M 101/40* | (2006.01) | |

(52) U.S. Cl.
CPC ........... *B01J 21/185* (2013.01); *B01J 35/004* (2013.01); *B01J 35/0013* (2013.01); *B01J 35/06* (2013.01); *B01J 37/349* (2013.01); *D01F 9/12* (2013.01); *D06M 11/44* (2013.01); *D06M 11/74* (2013.01); *D06M 23/08* (2013.01); *B01D 53/8668* (2013.01); *B01D 53/8687* (2013.01); *B01D 2239/045* (2013.01); *B01D 2239/0407* (2013.01); *B01D 2239/0442* (2013.01); *B01D 2239/0492* (2013.01); *B01D 2239/10* (2013.01); *B01D 2253/102* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2061* (2013.01); *B01D 2255/2065* (2013.01); *B01D 2255/2073* (2013.01); *B01D 2255/2094* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/20792* (2013.01); *B01D 2255/702* (2013.01); *B01D 2255/802* (2013.01); *B01D 2257/90* (2013.01); *B01D 2257/91* (2013.01); *B01D 2258/06* (2013.01); *B01J 23/06* (2013.01); *B01J 35/1057* (2013.01); *B01J 35/1061* (2013.01); *B01J 35/1066* (2013.01); *D06M 2101/40* (2013.01); *D10B 2505/04* (2013.01)

(56) References Cited

FOREIGN PATENT DOCUMENTS

| | | | |
|---|---|---|---|
| JP | 2003201668 A | * | 7/2003 |
| JP | 2004-148305 A | | 5/2004 |
| KR | 10-0656985 B1 | | 12/2006 |
| KR | 10-2007-0095705 A | | 10/2007 |
| KR | 10-2014-0103866 A | | 8/2014 |

* cited by examiner

[Figure 1]
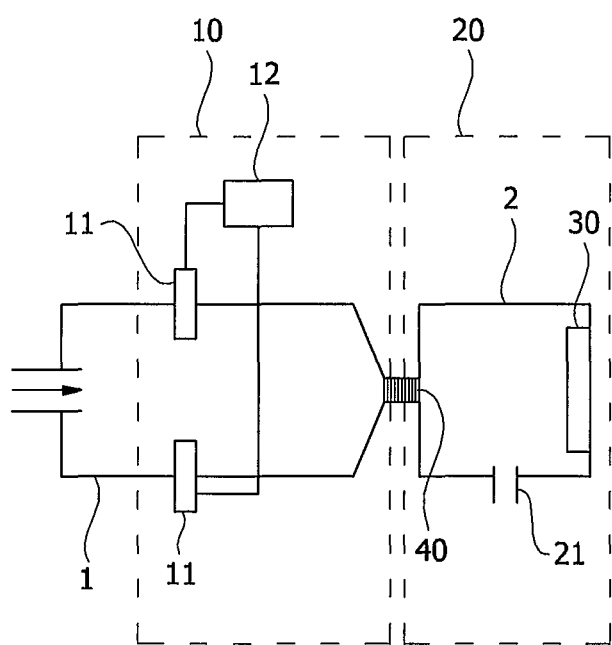

[Figure 2]
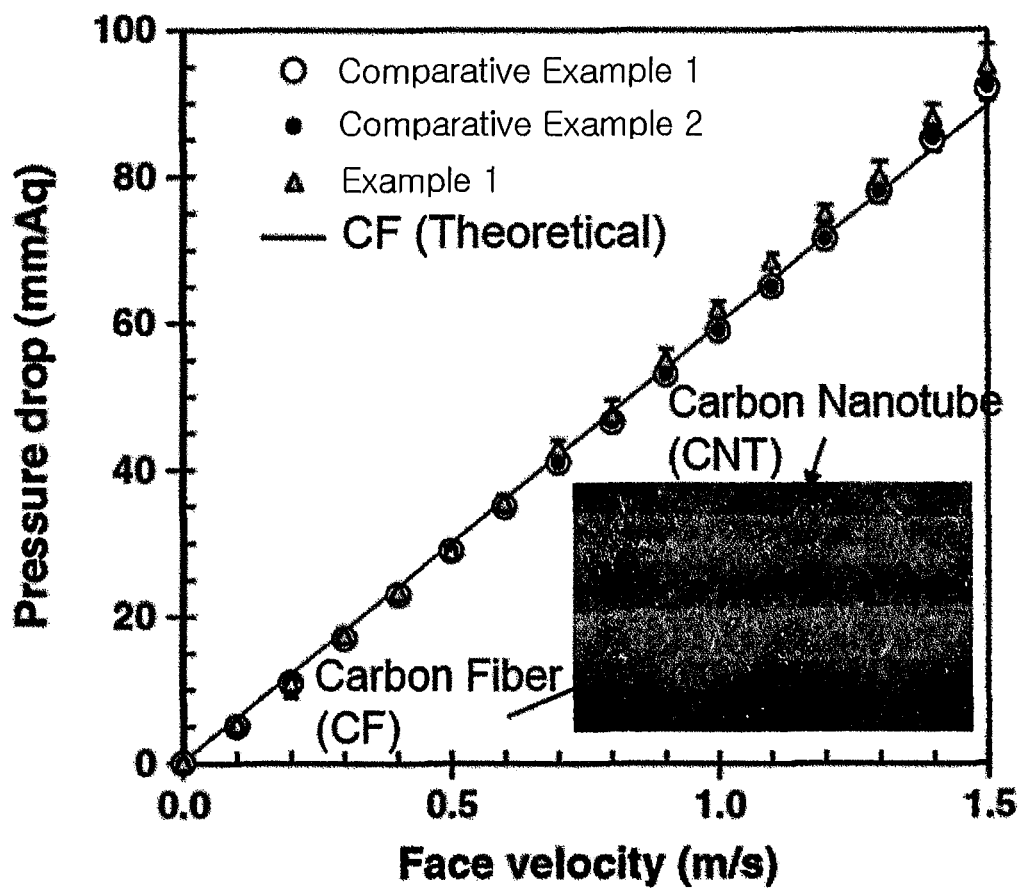

[Figure 3]
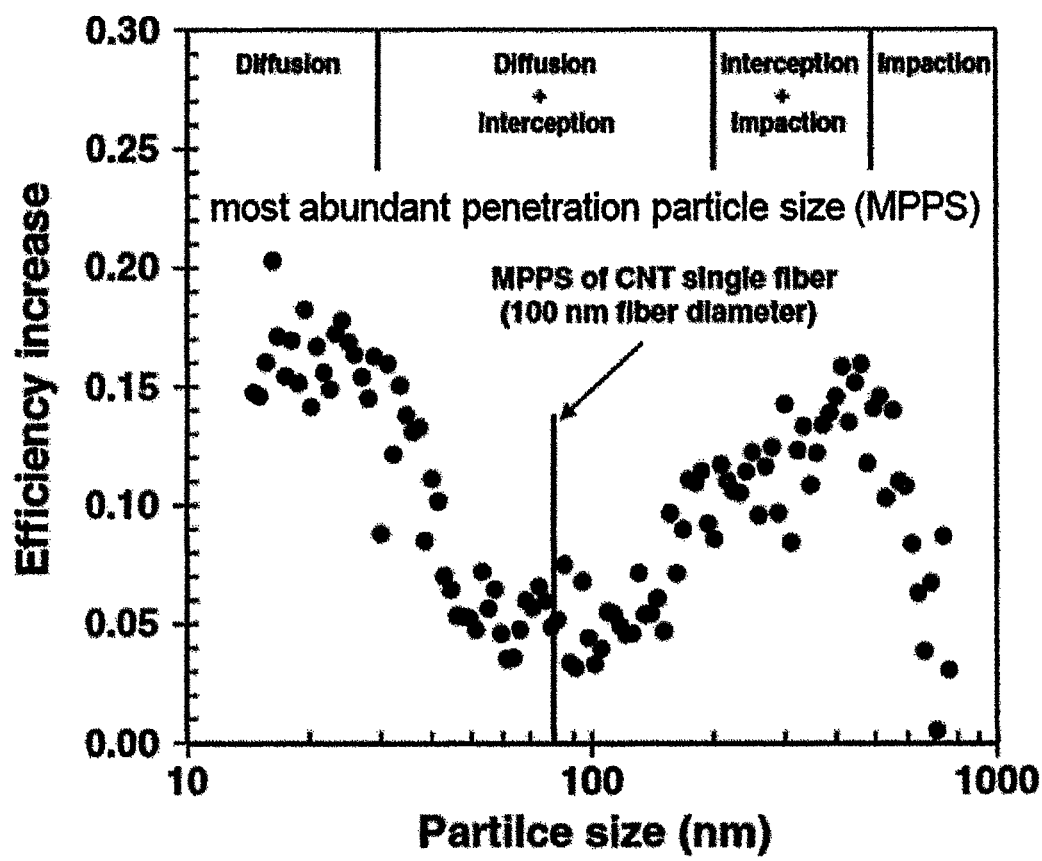

MULTIFUNCTIONAL FILTER MEDIUM, AND METHOD AND APPARATUS FOR MANUFACTURING SAME

TECHNICAL FIELD

The present application relates to a multifunctional filter medium and a method and apparatus for manufacturing the same.

BACKGROUND ART

As a filter medium for reducing dust entering vehicles, a fiber-based pocket-type or cassette-type product is used in most cases. However, there is a problem that such fiber-based pocket-type or cassette-type product causes an energy consumption increase in a vehicle duct system to increase dust collection efficiency. A duct system can consume up to 38% of the energy produced by a vehicle battery. Accordingly, a key issue is to reduce the energy consumption of a duct system in future electric vehicles.

To effectively reduce dust, harmful microorganisms, and toxic gases, a multistage system characterized by including an independent filter medium for each object to be removed has been used along with a method of further refining the size of a filter medium to improve the removal efficiency of fine dust. However, both methods caused an increased pressure drop. In addition, since a manufacturing process thereof is based on a liquid chemical process, functional materials are present inside fiber, not on a surface of the fiber, and, accordingly, there is a limitation in utilizing functional materials.

With regard to this, Korean Patent Application Publication No. 2014-0103866 discloses a filter medium and a method of manufacturing the same, but does not propose a counterplan regarding the problems.

DISCLOSURE

Technical Problem

The present application is directed to providing a multifunctional filter medium capable of significantly reducing fine dust, harmful microorganisms, and toxic gases, minimizing energy required for filtration, and being used as a single filter medium, a method and apparatus for manufacturing the multifunctional filter medium capable of fundamentally preventing the generation of process wastewater through application of dry technology without impregnation with liquid and allowing continuous production by a roll-to-roll system to provide high productivity.

Technical Solution

The present application relates to a multifunctional filter medium. A multifunctional filter medium according to an exemplary embodiment of the present application can significantly reduce fine dust, harmful microorganisms, and toxic gases and reduce a pressure decrease during filtration due to exclusion of high-density nanofiber, thereby minimizing energy required for filtration and exhibiting sufficient filtration performance as a single filter medium.

A filter medium according to an embodiment of the present application includes fiber; and photocatalyst particles on surfaces of which carbon nanotubes are grown. The photocatalyst particles adhere to a surface of the fiber.

The fiber may be porous. The porous fiber includes pores having a predetermined size and shape, thereby exhibiting high efficiency for removal of fine dust, harmful microorganisms, and toxic gases.

The diameter of the fiber may be 2 to 200 μm. The diameters of the pores in the fiber may be, for example, 1 to 100 nm. When the diameters of the pores in the fiber are within this range, the fiber may be utilized as fiber having micropores and mesopores efficient for adsorption of harmful gases. In addition, as the diameter of the fiber is similar to that of a conventional filter medium, a pressure drop may be maintained at a level the same as or lower than the case of the conventional filter medium.

The fiber is not specifically limited so long as it can form a filter medium. The fiber may be, for example, carbon fiber, ceramic fiber, metal fiber, a polymer fiber, or the like. Preferably, the fiber may be carbon fiber. In an embodiment, the fiber may be fiber forming a woven or knitted fabric or a nonwoven fabric. Accordingly, the method of the present application may be easily applied to a continuous process such as a roll-to-roll process, thereby providing high productivity. In addition, the woven or knitted fabric or the nonwoven fabric may be usefully used as a multifunctional filter medium product.

Since the photocatalyst particles allow carbon nanotubes to grow on surfaces thereof and have an excellent ability to oxidize and decompose organic materials, the photocatalyst particles may be effective in reducing odor-causing substances, viruses, bacteria, etc. present in the air.

A material type of the photocatalyst particles is not specifically limited so long as it allows growth of carbon nanotubes. The material may be a metal oxide. For example, the material may be, without being limited to, one or more selected from the group consisting of zinc oxide, titanium oxide, tungsten oxide, cerium oxide, tin oxide, zirconium oxide, and zinc sulfide. Preferably, the material may be, without being limited to, zinc oxide.

In an embodiment, the photocatalyst particles may further include one or more transition metals selected from the group of scandium (Sc), vanadium (V), chromium (Cr), manganese (Mn), iron (Fe), cobalt (Co), nickel (Ni), copper (Cu), yttrium (Y), niobium (Nb), molybdenum (Mo), ruthenium (Ru), rhodium (Rh), palladium (Pd), silver (Ag), cadmium (Cd), hafnium (Hf), tantalum (Ta), rhenium (Re), osmium (Os), iridium (Ir), platinum (Pt), and gold (Au) so as to increase the performance of the photocatalyst particles.

The diameters of the photocatalyst particles are not specifically limited and may be, for example, 200 nm or less. Preferably, the diameters may be 0.5 nm to 200 nm. When the diameters of the photocatalyst particles are less than 0.5 nm, collection efficiency thereof as fiber may be greatly decreased upon application of electrostatic attraction so as to attach photocatalyst particles, on which carbon nanotubes have been grown, to fiber in a subsequent process. When the diameters of the photocatalyst particles are greater than 200 nm, the carbon nanotubes do not satisfactorily grow or coarse tubes having a diameter of greater than 200 nm are generated, which are unsuitable for use as a filter medium.

The term "carbon nanotubes" refers to carbon tubes including nano-sized pores. Such carbon nanotubes have high filtration efficiency due to a large surface area and may reduce a pressure drop occurring during filtration due to high porosity.

Conventionally, a multistage filter medium including microfiber and nanofiber was used due to an increase of materials to be removed such as fine dust, microorganisms, and harmful gases. In this case, removal efficiency increased, but energy consumption also increased. The multifunctional filter medium according to the present application is manufactured by attaching the photocatalyst particles, on which carbon nanotubes have been grown, to fiber having a micro-sized diameter, thereby addressing the problem.

In addition, the present application provides a method of manufacturing the multifunctional filter medium. A method of manufacturing the multifunctional filter medium according to an exemplary embodiment of the present application can fundamentally prevent the generation of process wastewater through application of dry technology without impregnation with liquid and allows continuous production by a roll-to-roll system to provide high productivity.

An embodiment of the method of manufacturing the multifunctional filter medium of the present application includes a step of producing photocatalyst particles using a low-temperature plasma particle generator; a step of attaching the photocatalyst particles to a fiber; and a step of allowing carbon nanotubes to grow on surfaces of the photocatalyst particles attached to the fiber.

Hereinafter, an embodiment of the method of the present application is described in detail.

First, photocatalyst particles are produced using a low-temperature plasma particle generator in the flow of an inert gas.

The inert gas may be used as a carrier gas for the photocatalyst particles. In an embodiment, the inert gas may serve to transport the photocatalyst particles to the fiber.

As the inert gas, an inert gas known in the technical field may be used without specific limitation. For example, the inert gas may be one or more selected from the group consisting of nitrogen, argon and helium. Preferably, the inert gas may be nitrogen. The inert gases may be each independently used or used as a mixture of two or more thereof.

In an embodiment, the inert gas flow may include oxygen or hydrogen sulfide ($H_2S$). Such oxygen or hydrogen sulfide ($H_2S$) may be used as a reaction gas in the production of the photocatalyst particles. For example, a metal component reacts with oxygen or hydrogen sulfide by supplying oxygen or hydrogen sulfide into a low-temperature plasma particle generator in the inert gas flow, thereby producing photocatalyst particles such as metal oxides or metal sulfides.

A volume ratio of the oxygen or hydrogen sulfide ($H_2S$) based on a total volume of the inert gas is not specifically limited and may be, for example, 0.01 to 5% by volume. When the volume ratio is less than 0.01% by volume, the amount of produced photocatalyst particles may be too small in terms of productivity. When the volume ratio is greater than 5% by volume, process costs may greatly increase.

The photocatalyst particles are produced using a low-temperature plasma particle generator. The low-temperature plasma particle generator forms photocatalyst particles by vaporizing a metal component using high-temperature heat that is generated by low-temperature plasma. Particularly, when a high voltage is applied to both metal electrodes, low-temperature plasma is generated, and metal components of the metal electrodes vaporize and then are condensed due to a high temperature generated by the low-temperature plasma, resulting in formation of photocatalyst particles. In this case, when oxygen or hydrogen sulfide ($H_2S$), other than the inert gas, is additionally supplied as described above, photocatalyst particles of a metal oxide or metal sulfide may be formed.

Here, a distance between both metal electrodes may be 0.5 mm to 10 mm. For example, when a distance between the metal electrodes is 1 mm, metal components of the metal electrodes vaporize while high-temperature heat of about 5000° C. is generated upon application of a high voltage of 2.5 kV to 3 kV, whereby photocatalyst particles are formed. In addition, oxygen or hydrogen sulfide ($H_2S$) in supplied gases reacts with metal components, whereby photocatalyst particles of a metal oxide or metal sulfide may be formed. The vaporized photocatalyst particles may be cooled and condensed due to an environment of rapidly lowered temperature during movement to the outside of the low-temperature plasma, at which a temperature is low compared to a low-temperature plasma generation region.

A high-voltage power source applied to the metal electrodes may be direct current or alternating current. When the high-voltage power source is alternating current, the power source may be applied in various manners such as square waves, triangular waves, and offset control.

Next, the produced photocatalyst particles are attached to the fiber along the flow of the inert gas.

In an embodiment, in the step of attaching the photocatalyst particles to the fiber, the photocatalyst particles may reach the fiber by the flow of the inert gas and may be attached thereto.

In another embodiment, the step of attaching the photocatalyst particles to the fiber may be performed by at least one of an electrostatic attraction method and a thermophoretic method. In an embodiment, the step of attaching the photocatalyst particles to the fiber may be performed by electrostatic attraction generated by charging the photocatalyst particles and the fibers with opposite charges. For example, when the photocatalyst particles are positively charged, a pulse current or an alternating current is applied to the fiber to negatively charge the fiber, whereby the photocatalyst particles may be more quickly attached.

Next, carbon nanotubes are grown on surfaces of the photocatalyst particles attached to the fiber.

A method of growing the carbon nanotubes is not specifically limited and may be, for example, a heat treatment method. In an embodiment, the fiber, to which the photocatalyst particles have been attached, is heat-treated in a deposition chamber, whereby the carbon nanotubes may grow on surfaces of the photocatalyst particles.

The deposition chamber may have, without being limited to, a temperature of 500 to 2000° C. and a pressure of 0.05 to 500 torr. When the temperature and pressure of the deposition chamber are controlled within these ranges, carbon nanotubes may regularly grow. The deposition chamber may be, for example, a chemical vapor deposition chamber.

In an embodiment, a reaction gas for forming carbon nanotubes may be supplied to the deposition chamber. The reaction gas may be a carbon-based gas.

The carbon-based gas is not specifically limited so long as it includes carbon. For example, the carbon-based gas may be, without being limited to, one or more selected from the group of methane, ethane, propane, ethylene and acetylene.

In addition, another embodiment of the method of manufacturing the multifunctional filter medium according to the present application includes a step of producing photocatalyst particles using a low-temperature plasma particle generator; a step of allowing carbon nanotubes to grow on surfaces of the photocatalyst particles; and a step of attaching the photocatalyst particles, on which the carbon nanotubes have been grown, to a fiber.

The step of producing the photocatalyst particles may be performed in the same manner as described above. Accordingly, a detailed description thereof is omitted.

Next, carbon nanotubes are grown on surfaces of the photocatalyst particles.

The carbon nanotubes may grow by heat-treating photocatalyst particles, which have been moved by an inert gas, in a deposition chamber. Particulars of the method of allowing the carbon nanotubes to grow may be the same as the aforementioned particulars. Accordingly, a detailed description thereof is omitted.

Next, the photocatalyst particles, on which the carbon nanotubes have been grown, are attached to a fiber.

In an embodiment, the photocatalyst particles may reach the fiber by the flow of the inert gas and may be attached thereto, as described above.

In another embodiment, the process of attaching the photocatalyst particles to the fiber may be performed by at least one of an electrostatic attraction method and a thermophoretic method. In still another embodiment, the step of attaching the photocatalyst particles to the fiber may be performed by a thermophoretic method of using a temperature difference between catalyst particles and a fiber. For example, since the photocatalyst particles have a characteristic of moving from high temperature to low temperature, the photocatalyst particles may be attached to the fiber by cooling the fiber to use a temperature difference with the fiber. The fiber may be cooled, for example, by disposing a cooling device at a part of rolls serving to transport the same.

A temperature difference between the photocatalyst particles, on which the carbon nanotubes have been grown, and the fiber may be 1 to 199° C. When the temperature difference is less than 1° C., a thermophoresis rate is low, whereby a process time may be extended. When the temperature difference is greater than 199° C., process costs may increase. Since the thermophoresis rate is proportional to the temperature difference, the thermophoresis rate may increase with an increased temperature difference.

The manufacturing method of the present application may further include a step of classifying the photocatalyst particles by particle sizes thereof after producing the photocatalyst particles.

The step of classifying the photocatalyst particles by particle sizes thereof may be performed, for example, using an electrostatic classifier. For example, particles having a diameter of 2 to 1000 nm may be isolated from polydisperse aerosol particles electrically input. Accordingly, only photocatalyst particles having a desired size may be isolated, and the isolated photocatalyst particles may be attached to a surface of the fiber to a more uniform thickness.

The present application relates to an apparatus for manufacturing the multifunctional filter medium. By means of an apparatus for manufacturing the multifunctional filter medium according to an exemplary embodiment of the present application, the generation of process wastewater may be fundamentally prevented through application of dry technology without impregnation with liquid, and high productivity may be provided by allowing continuous production using a roll-to-roll system.

Hereinafter, a manufacturing apparatus according to the present application is described in more detail with reference to the accompanying drawings.

FIG. 1 illustrates a schematic view of an apparatus for manufacturing a functional fiber for heavy metal adsorption according to an embodiment of the present application. As illustrated in FIG. 1, the manufacturing apparatus of the present application includes a discharge part 10; a deposition part 20, and a collection part 30.

The discharge part 10 is provided to generate photocatalyst particles from electrodes. In the discharge part 10, low-temperature plasma is discharged, and photocatalyst particles are generated from electrodes made of a metal due to the low-temperature plasma discharge.

In an embodiment, the discharge part 10 includes a pair of electrodes 11 spaced apart from each other by a predetermined distance and, although not shown, may include a gas supplier, such as a carrier air supply system, and a flowmeter such as a mass flow controller (MFC). In addition, an inert gas, such as nitrogen, may be quantitatively supplied to a first chamber 1 through the gas supplier and the flowmeter.

When a high voltage is applied to the electrodes 11, the metal is vaporized or granulated due to discharge of the low-temperature plasma and thus may be discharged to the deposition part 20 along the flow of an inert gas or nitrogen flowing through a gap between the electrodes 11. For example, when a voltage is applied to the electrodes 11 of the discharge part 10, the metal is vaporized in a gap between the pair of electrodes 11 of the discharge part 10. The vaporized metal, which has been transported along a carrier gas such as an inert gas or nitrogen, departs from the gap and thus is condensed, so that metal particles are formed. The metal may include, without being limited to, one or more selected from the group consisting of titanium, tungsten, cerium, tin, zirconium, and zinc.

In an embodiment, the discharge part 10 may include an electric circuit 12 configured to apply a high voltage to the electrodes 11. The electric circuit 12 has a constant high voltage source structure constituted of a high voltage supply source (HV), an external capacitor (C), and a resistor (R), and may control the sizes of metal photocatalyst particles using multiple resistors, multiple capacitors, and a circuit capable of performing high-speed switching of a circuit current.

In addition, a voltage required for ignition is lowered as the gap between the electrodes 11, e.g., an electrode gap which is the shortest distance between the electrodes 11, is smaller, and the voltage required for ignition increases as the gap increases. In addition, when the electrode gap is narrow, a voltage required to generate a spark is reduced, but the short spark may transfer minimum ignition energy to a mixer to cause a misfire. Accordingly, it is necessary to set an appropriate distance through experiments. In an embodiment, the electrode gap may be, without being limited to, 0.5 mm to 10 mm.

Particle diameters of the photocatalyst particles generated from the discharge part 10 may be widely controlled to units of several nanometers to hundreds of nanometers depending upon the flow rate of the inert gas. For example, the concentration of the photocatalyst particles is decreased when the flow rate of the supplied inert gas increases, whereby aggregation among the particles is also reduced. Through such a process, the sizes of the photocatalyst particles may be reduced. In addition, the particle diameters, shapes, and densities of the photocatalyst particles may be changed by spark generation conditions, such as an applied voltage, a frequency, a current, a resistance, and a capacitance value, an inert gas type and the flow rate thereof, the shape of spark electrodes, etc.

The inert gas may be, without being limited to, nitrogen (N), argon (Ar), helium (He), or the like.

As described above, flow of the inert gas may include oxygen or hydrogen sulfide ($H_2S$). The oxygen or the hydrogen sulfide ($H_2S$) may be used as a reaction gas in the production of the photocatalyst particles. For example, a metal component reacts with oxygen or hydrogen sulfide when the oxygen or hydrogen sulfide is supplied to a low-temperature plasma particle generator in the flow of the inert gas, whereby photocatalyst particles derived from a metal oxide, a metal sulfide, or the like may be produced.

The deposition part 20 is provided to allow carbon nanotubes to grow on surfaces of the photocatalyst particles so as to introduce the carbon nanotubes to the photocatalyst particles.

In an embodiment, the deposition part 20 may include a deposition chamber 2. Although not shown, the deposition chamber 2 may include a heat treatment means for heat-treating the photocatalyst particles. The heat treatment means may be, for example, a heating means such as a heater. The deposition chamber 2 may have, without being limited to, a temperature of 500 to 2000° C. and a pressure of 0.05 to 500 torr. When the temperature and pressure of the deposition chamber are controlled within these ranges, the carbon nanotubes may regularly grow. The deposition chamber may be, for example, a chemical vapor deposition chamber.

The deposition chamber 2 may be provided with a reaction gas supplier 21. A reaction gas for forming carbon nanotubes may be supplied to the deposition chamber 2 through the reaction gas supplier 21. The reaction gas may be a carbon-based gas. The carbon-based gas is not specifically limited so long as it is a gas including carbon. For example, the carbon-based gas may be, without being limited to, one or more selected from the group consisting of methane, ethane, propane, ethylene, and acetylene. In an embodiment, the reaction gas may be, for example, supplied through the reaction gas supplier 21 after the photocatalyst particles are attached to the fiber in the collection part 30 described below. In this case, carbon nanotubes may grow from surfaces of the photocatalyst particles, which have been attached to the fiber, in the collection part 30. In another embodiment, the reaction gas may be supplied through the reaction gas supplier 21 before the photocatalyst particles are attached to the fiber in the collection part 30. In this case, photocatalyst particles, on surfaces of which carbon nanotubes have been grown, may be attached to the fiber in the collection part 30.

The manufacturing apparatus of the present application includes the collection part 30 serving to attach the photocatalyst particles, on which the carbon nanotubes have been grown, to a porous fiber. In an embodiment, the collection part 30 may be located on an inner wall of the aforementioned deposition part 20, as illustrated in FIG. 1. In the collection part 30, the photocatalyst particles are attached to the porous fiber, whereby a porous fiber including the photocatalyst particles attached thereto may be obtained.

In an embodiment, the manufacturing apparatus may include a particle diameter separation part 40 between the discharge part 10 and the deposition part 20. The particle diameter separation part 40 may include a filter or an electrostatic separator used for filtration and the like. The filter may be made of, for example, a fluororesin such as polytetrafluoroethylene (PTFE); a polyamide-based resin such as nylon-6 or nylon-6,6; a polyolefinic resin such as polyethylene, polypropylene (PP); or the like.

In addition, a pore diameter of the filter is not specifically limited and may be, for example, 2 to 2000 nm. Photocatalyst particles having a uniform average particle diameter may be produced by controlling the pore diameter of the filter within the range. Photocatalyst particles with a desired size isolated in such a manner may be attached to a surface of the fiber to a more uniform thickness.

In an embodiment, the discharge part 10, the deposition part 20 and the collection part 30 may be maintained under an inert gas atmosphere. The expression "maintained under an inert gas atmosphere" may also mean that the photocatalyst particles according to the present application sequentially move to the discharge part 10, the deposition part 20, and the collection part 30 along the flow of an inert gas.

Advantageous Effects

A multifunctional filter medium according to the present application can significantly reduce fine dust, harmful microorganisms, and toxic gases and reduce a pressure decrease during filtration due to exclusion of high-density nanofiber, thereby minimizing energy required for filtration and exhibiting sufficient filtration performance as a single filter medium.

DESCRIPTION OF DRAWINGS

FIG. 1 is a schematic diagram illustrating an apparatus for manufacturing a multifunctional filter medium according to an embodiment of the present application.

FIG. 2 is a result illustrating a face velocity-dependent pressure drop measured using filter mediums of Example 1 and Comparative Examples 1 to 2.

FIG. 3 is a graph illustrating a dust particle size-dependent collection efficiency increase rate of a filter medium of Example 1 with respect to a conventional filter medium in which carbon nanotubes are not grown.

DESCRIPTION OF SYMBOLS

1: FIRST CHAMBER
10: DISCHARGE PART
11: ELECTRODE
12: ELECTRIC CIRCUIT
2: DEPOSITION CHAMBER
20: DEPOSITION PART
30: COLLECTION PART
40: PARTICLE DIAMETER SEPARATION PART

BEST MODE

Now, the present application will be described in more detail with reference to the following preferred examples. However, these examples are provided for illustrative purposes only and are not intended to limit the appended claims. Those skilled in the art will appreciate that various modifications, additions and substitutions are possible, without departing from the scope and spirit of the application. Therefore, it is obvious that the modifications, additions and substitutions are within the scope of the present application.

Example 1

Zinc oxide particles, as photocatalyst particles, were produced by means of a low-temperature plasma particle generator while flowing nitrogen gas at 2.97 L/min and oxygen gas at 0.03 L/min. Here, the low-temperature plasma particle generator was operated under the following conditions: resistance: 0.5 MΩ, capacitance: 1.0 nF, load current: 2 mA, applied voltage: 3 kV, and frequency: 667 Hz, and positive electrode material and negative electrode material: zinc.

The zinc oxide particles reached a carbon fiber (KF-1600, Toyobo, Japan) by flow of the nitrogen gas and then were attached thereto.

Next, acetylene gas was supplied at 30 mL/min, in a nitrogen gas flow at 3 L/min, to a chemical vapor deposition chamber at 650° C. under a pressure of 2.5 torr to allow carbon nanotubes to grow on surfaces of the zinc oxide particles attached to the fiber. As a result, a filter medium was manufactured.

Example 2

Zinc oxide particles, as photocatalyst particles, were produced by means of a low-temperature plasma particle generator while flowing nitrogen gas at 2.97 L/min and oxygen gas at 0.03 L/min. Here, the low-temperature plasma particle generator was operated under the following conditions: resistance: 0.5 MΩ, capacitance: 1.0 nF, load current: 2 mA, applied voltage: 3 kV, and frequency: 667 Hz, and positive electrode material and negative electrode material: zinc.

Next, photocatalyst particles were fed into the chemical vapor deposition chamber, and then acetylene gas was supplied at 30 mL/min, in a nitrogen gas flow at 3 L/min, to a chemical vapor deposition chamber at 650° C. under a pressure of 2.5 torr to allow carbon nanotubes to grow on surfaces of zinc oxide particles.

Next, a temperature difference between the zinc oxide particles, on which the carbon nanotubes grew, and the fiber was adjusted to 35° C. to attach the photocatalyst particles, on which the carbon nanotubes grew, to the carbon fiber. As a result, a filter medium was produced.

Comparative Example 1

A carbon fiber, to which photocatalyst particles were not attached, was prepared.

Comparative Example 2

An experiment was performed in the same manner as in Example 1 except that a process of allowing carbon nanotubes to grow on surfaces of zinc oxide particles was not performed. The zinc oxide particles, on which carbon nanotubes were not grown, were attached to a carbon fiber, thereby producing a filter medium.

Experimental Examples

<Evaluation of Pressure Drop Dependent Upon Face Velocity>

To evaluate a pressure drop dependent upon a face velocity, an air hydraulic pressure difference before and after passing through a filter medium was measured by means of a digital differential pressure gauge (PLT-D5000 Pa, ULFA Technology, Korea).

FIG. 2 illustrates results of a pressure drop dependent upon a face velocity measured using filter mediums of Example 1 and Comparative Examples 1 to 2. As illustrated in FIG. 2, it can be confirmed that the carbon fiber of Comparative Example 1 and the carbon fiber, to a surface of which photocatalyst particles were attached, of Comparative Example 2 exhibit a pressure drop value similar to that of a theoretical carbon fiber filter medium as the face velocity increases. In addition, as illustrated in FIG. 2, it can be confirmed that a pressure drop degree of the filter medium of Example 1 is maintained at almost the same level without any difference in the pressure drop degree as a face velocity increases, compared to the filter mediums of the comparative examples.

That is, it can be confirmed that, in the case of the filter medium of Example 1, energy required for ultrafine dust filtration can be minimized because an additional pressure drop does not occur although the carbon nanotubes were grown, and sufficient filtration performance can be provided even using a single filter medium because a high-density filter medium is not additionally required for ultrafine dust filtration.

<Evaluation of Collection Efficiency Dependent Upon Dust Particle Size>

To evaluate collection efficiency dependent upon a dust particle size, the sizes of supplied particles were measured before and after passing through a filter medium by means of a scanning mobility particle sizer (SMPS, 3936, TSI, USA). The collection efficiency was calculated using a size difference before and after passing through the filter medium.

FIG. 3 is a graph illustrating a dust particle size-dependent collection efficiency increase rate of the filter medium of Example 1 with respect to a conventional filter medium in which carbon nanotubes were not grown. As illustrated in FIG. 3, it can be confirmed that the conventional filter medium including a fiber, on which carbon nanotubes have not been grown, exhibits decreased diffusion, interception, and inertial impaction due to Brownian motion in the presence of ultrafine dust with a particle diameter of about 20 nm to 500 nm, thereby exhibiting decreased filtration efficiency. However, it can be confirmed that the filter medium of Example 1 exhibits excellent collection efficiency for ultrafine dust having a particle diameter of about 20 nm to 500 nm.

That is, it was confirmed that the filter medium of Example 1 can significantly reduce fine dust, harmful microorganisms, and toxic gases.

The invention claimed is:

1. A method of manufacturing a multifunctional filter medium, the method comprising:
   a step of producing photocatalyst particles using a plasma particle generator that generates high-temperature heat of about 5000° C.;
   a step of attaching the photocatalyst particles to a fiber; and
   a step of allowing carbon nanotubes to grow on surfaces of the photocatalyst particles attached to the fiber,
   wherein the step of producing and the step of attaching are performed in a flow of an inert gas, and
   wherein the inert gas flow includes oxygen or hydrogen sulfide ($H_2S$).

2. The method according to claim 1, wherein, in the step of attaching, the photocatalyst particles reach the fiber by the inert gas flow and are attached thereto.

3. The method according to claim 1, wherein the step of attaching is performed by at least one of a thermophoretic method and an electrostatic attraction method.

4. The method according to claim 1, wherein the step of allowing is performed at 500 to 2000° C.

5. The method according to claim 1, wherein the step of allowing is performed under a pressure of 0.05 to 500 torr.

6. The method according to claim 1, further comprising, after production of the photocatalyst particles, a step of classifying the photocatalyst particles by particle diameters thereof.

7. A method of manufacturing a multifunctional filter medium, the method comprising:
   a step of producing photocatalyst particles using a plasma particle generator that generates high-temperature heat of about 5000° C.;
   a step of allowing carbon nanotubes to grow on surfaces of photocatalyst particles; and a step of attaching the photocatalyst particles including the carbon nanotubes grown thereon to the fiber, wherein the step of producing and the step of attaching are performed in a flow of an inert gas, and wherein the inert gas flow includes oxygen or hydrogen sulfide ($H_2S$).

8. The method according to claim 7, wherein the step of allowing is performed at 500 to 2000° C.

9. The method according to claim 7, wherein the step of allowing is performed under a pressure of 0.05 to 500 torr.

10. The method according to claim 7, further comprising, after production of the photocatalyst particles, a step of classifying the photocatalyst particles by particle diameters thereof.

* * * * *